United States Patent
Allio et al.

(10) Patent No.: US 10,819,975 B2
(45) Date of Patent: Oct. 27, 2020

(54) SYSTEM AND METHOD FOR DISPLAYING A 2 POINT SIGHT AUTOSTEREOSCOPIC IMAGE ON AN NOS POINT SELF-ESISTICAL DISPLAY SCREEN AND PROCESSING DISPLAY CONTROL ON SUCH DISPLAY SCREEN

(71) Applicant: ALIOSCOPY, Paris (FR)

(72) Inventors: Pierre Allio, Paris (FR); Flavien Maingreaud, Commeny (FR)

(73) Assignee: ALIOSCOPY, Paris (FR)

( * ) Notice: Subject to any disclaimer, the term of this patent is extended or adjusted under 35 U.S.C. 154(b) by 186 days.

(21) Appl. No.: 16/141,939

(22) Filed: Sep. 25, 2018

(65) Prior Publication Data

US 2019/0124324 A1    Apr. 25, 2019

Related U.S. Application Data

(60) Provisional application No. 62/589,545, filed on Nov. 21, 2017.

(30) Foreign Application Priority Data

Sep. 26, 2017 (FR) .................................. 17 58881

(51) Int. Cl.
*H04N 9/47* (2006.01)
*H04N 13/366* (2018.01)
(Continued)

(52) U.S. Cl.
CPC ....... *H04N 13/366* (2018.05); *G02B 27/0093* (2013.01); *G02B 30/27* (2020.01);
(Continued)

(58) Field of Classification Search
CPC ........ G02F 2001/133391; G02F 2001/133626; G06F 1/1601; G06F 1/1605; G06F 2200/1612; G06F 3/011; G06F 3/012
See application file for complete search history.

(56) References Cited

U.S. PATENT DOCUMENTS 6,329,963 B1 * 12/2001 Chiabrera ............ H04N 13/365
345/6
2006/0170764 A1 * 8/2006 Hentschke ........... H04N 13/317
348/42

(Continued)

*Primary Examiner* — Peet Dhillon
(74) *Attorney, Agent, or Firm* — Steven M. Greenberg, Esq.; Shutts & Bowen LLP (57) ABSTRACT

The invention relates to displaying an autostereoscopic image of two viewpoints, each formed of strips of subpixels, called image strips, on an autostereoscopic display screen configured to display N viewpoints, N being greater than or equal to 3. The method includes detecting the position of a privileged observer relative to the screen; determining, for each eye of the observer, strips of the screen visible by the eye at the detected position; determining, for each eye of the observer, strips that are not visible by either of the two eyes at the position; an assignment to the subpixels, of the visible strips of the screen for each eye, of subpixels corresponding to the image strip of the corresponding eye; an assignment to the subpixels, of the non-visible strips of the screen, of subpixels corresponding to safety viewpoints constructed from subpixels of the image strips.

5 Claims, 8 Drawing Sheets

(51) Int. Cl.
- *H04N 13/305* (2018.01)
- *H04N 13/31* (2018.01)
- *G02B 27/00* (2006.01)
- *G02B 30/27* (2020.01)
- *H04N 13/324* (2018.01)
- *H04N 13/398* (2018.01)
- *H04N 13/279* (2018.01)

(52) U.S. Cl.
CPC ........... *H04N 13/305* (2018.05); *H04N 13/31* (2018.05); *H04N 13/324* (2018.05); *H04N 13/398* (2018.05); *H04N 13/279* (2018.05)

(56) References Cited

U.S. PATENT DOCUMENTS

| | | | |
|---|---|---|---|
| 2009/0123030 A1* | 5/2009 | De La Barre | H04N 13/31 382/103 |
| 2014/0071253 A1* | 3/2014 | de la Barre | H04N 13/317 348/51 |

* cited by examiner

SYSTEM AND METHOD FOR DISPLAYING A 2 POINT SIGHT AUTOSTEREOSCOPIC IMAGE ON AN NOS POINT SELF-ESISTICAL DISPLAY SCREEN AND PROCESSING DISPLAY CONTROL ON SUCH DISPLAY SCREEN

CROSS REFERENCE TO RELATED APPLICATIONS

This application claims priority under 35 U.S.C. § 119(a) to U.S. Provisional Patent Application Ser. No. 62/589,545, filed Nov. 21, 2017, which claims priority to French Patent Application Serial Number 1758881, filed Sep. 26, 2017, the entire teachings of which are incorporated herein by reference.

BACKGROUND OF THE INVENTION

Field of the Invention

The invention relates to a system and method for autostereoscopic display.

Description of the Related Art

Autostereoscopy is a technique for displaying images in relief without requiring the user to wear special spectacles. This technique is known per se, particularly from Patent Cooperation Treaty (PCT) published requests WO2006/024764, WO2014/041504, WO2013/140363, WO2014/016768. In general, an autostereoscopic image is composed of a plurality of interlaced elemental image strips, each corresponding to views of the same object or the same scene from different points of view. A selector device, typically composed of an array of cylindrical lenticules or a parallax barrier, is disposed in front of the display screen so as to allow the projection of a pair of elemental images corresponding to two different viewpoints of the scene, respectively towards the two eyes of the observer, which creates an impression of relief in the observer's brain.

One of the disadvantages of known autostereoscopic techniques is the large number of viewpoints that are needed simultaneously on the screen. Indeed, unlike spectacles technologies where only two viewpoints are necessary, autostereoscopy requires a large number of viewpoints to free the observer from the limitations of positioning.

In the context of autostereoscopy, it may be considered that it is the screen that wears the spectacles. A good compromise that is known, combining good screen resolution, quality of the observed image and freedom of movement of the observer in front of the screen consists of utilizing eight different points of view.

The applicant has already proposed an autostereoscopic screen including a matrix of pixels arranged in lines and columns, each pixel being composed of a plurality of subpixels of different colours. Moreover, the screen is overlaid with an array of identical cylindrical lenticules each having a focus configured to be able to send back the light rays from the screen ad infinitum. The width of the lenses is approximately equal to the width of 8 subpixels (since the applicant recommends the use of a single subpixel per viewpoint per lens and per horizontal line instead of one pixel). Nevertheless, other configurations are possible without substantially modifying the achieved effect. The pitch of the array of cylindrical lenticules is precisely calculated so that the observer sees, at a predetermined distance from the screen (called solid colour distance, which is for example fixed at 85 cm), the images occur every 6.5 cm (average separation between the eyes, chosen as the calculation basis), thanks to the magnifying effect of the array of lenticules.

This magnifying effect results from the fact that a lens placed at the proper distance (its focal length) enlarges the subpixel located in the alignment of its optical axis and the pupil of the observer's eye. If the lens enlarges 8 times, the subpixel seen through the lens is perceived 8 times larger than it is in reality, and for the eye that receives the light through this lens, the subpixel conceals the other 7 subpixels that are in the previously described alignment.

Thus, the observer perceives only one eighth of the resolution of the screen for each eye. These points, associated to form an image or a viewpoint, are all enlarged 8 times horizontally. Seven eighths of the resolution remain in order to register 7 other viewpoints according to the same method.

The space in front of the screen is then divided into 52 cm zones, called lobes, in which the 8 viewpoints can be perceived successively every 6.5 cm. When one leaves a lobe, one finds the succession of 8 identical viewpoints.

Thus, an observer who moves parallel to the plane of the screen 85 cm from it (in the case where the solid colour distance is fixed at 85 cm), from the position farthest right to the position farthest left sees with a single eye the viewpoints occurring every 6.5 cm in series of 8 forming a lobe and again the same 8 forming the second lobe and thus in succession.

The observer's two eyes being separated by an average of 6.5 cm, when the right eye sees one viewpoint n (n being between 1 and 8 in the case of a screen with 8 viewpoints), the left eye sees the complementary viewpoint at n−1 or n+7 and he perceives an image in relief. When he moves towards the left or right, his eyes change position and therefore simultaneously change viewpoints, and the sensation remains as if in front of a real scene.

The limitation of movement of the observer is therefore explained by the fact that if the observer has one eye in one lobe and the other eye in an adjacent lobe, not only are the images perceived by both eyes not sequential as is the case when both eyes perceive images from the same lobe (image pairs 1-2; 2-3; 3-4; 4-5; 5-6; 6-7; 7-8), but in addition the image perceived by the right eye is then a viewpoint farther left than the image perceived by the left eye or vice versa. In other words, in moving from a lobe, it is the image pair 1-8 that is perceived. The separation between these viewpoints is then much too great for the observer to be able to reconstruct the relief in his brain. The sensation produced is so uncomfortable that it is impossible to remain in this position without an immediate serious headache. The relief is totally incoherent and reversed, which is called pseudoscopy. It is then necessary to offset slightly towards the right or towards the left to find a pair of successive views.

The inventors have therefore sought a solution to completely free an observer from limitations of movement, allowing both movements parallel to the screen but also movements perpendicular to the screen.

BRIEF SUMMARY OF THE INVENTION

The invention seeks to provide an autostereoscopic system and method of display that eliminate the occasional appearance of pseudoscopic images.

The invention also seeks to provide, in at least one embodiment, an autostereoscopic system and method of display that avoid the appearance of phantom images.

The invention also seeks to provide, in at least one embodiment of the invention, an autostereoscopic system and method of display that fully frees up the observer for movements, both parallel to the screen and perpendicular to the screen, while still maintaining a quality of the image perceived by the observer.

The invention also seeks to provide a method of control of the display of an autostereoscopic display screen equipped with a device for detection of the observer's position.

To that end, the invention relates to a method of display of an autostereoscopic image of two viewpoints, called image viewpoints, each formed of a plurality of strips of subpixels, called image strips, on an autostereoscopic display screen configured to display N viewpoints, called screen viewpoints, N being greater than or equal to 3, and including a matrix of pixels arranged by lines and columns, each pixel being composed of a plurality of subpixels of different colours, the display screen including an optical component, such as an array of cylindrical lenticules or parallax barrier, configured to allow the projection of two predetermined screen viewpoints respectively to the right eye and to the left eye of a privileged observer located at a nominal distance from the screen, the so-called solid colour distance.

The method according to the invention further includes the following steps:
  a step of detection, at each instant, of the position of the observer relative to a predetermined point of the display screen, enabling the coordinates X, Y, Z of the observer to be defined with a predetermined accuracy, in an orthonormal reference system in which the predetermined point of the screen is the origin of the reference system, the screen defining the axes X and Y of the reference system and the direction perpendicular to the screen defining the axis Z of the reference system,
  a step of determining, for each eye of the observer at the detected position, subpixels of the screen forming strips visible by that eye and corresponding to $1/N^{th}$ of the total screen,
  a step of determining subpixels of the screen forming strips of the screen that are not visible by either of the observer's two eyes at the detected position and corresponding to $N-2/N^{th}$ of the total screen,
  a step of assigning to the subpixels of each visible strip of the screen, for each eye of the observer at the detected position, subpixels of the respective image strip for that eye,
  a step of assigning to the subpixels of the strips of the screen not visible by each of the two eyes of the observer, subpixels corresponding to viewpoints, called safety viewpoints, constructed from subpixels of image strips and intended to adapt the display to movements in X, Y and Z of the observer and to compensate for the accuracy of detection of the position of the privileged observer.

A method according to the invention therefore provides for displaying an autostereoscopic image consisting only of two elemental images to form only two viewpoints (respectively for the right eye and for the left eye of the observer) on a screen configured to display at least three viewpoints (designated hereinafter as multi-viewpoints screen). In other words, the invention provides for diverting the use of a multi-viewpoint screen (i.e. configured to display at least 3 viewpoints) having a known predetermined configuration (particularly the physical solid colour distance from the screen) and to display only two viewpoints so as to be able to use the pixels initially dedicated to the unused screen viewpoints, in order to display thereupon safety viewpoints constructed from two viewpoints of the image. In particular, the safety viewpoints make it possible to eliminate the lobe shifts and to improve the quality of observation in the event the observer moves relative to the screen (parallel to the screen, as well as perpendicular thereto). Thus, the use of a multi-viewpoint screen to display an image of only two viewpoints makes it possible to conceal the visible transitions at the locations of the screen where the pseudoscopy or orthoscopy areas occur in the displayed image.

The method also provides for detecting the position of the observer by a dedicated device. Such dedicated device is designated in the text by the terms "device for detecting the position of an observer", or by the term "tracking device" as currently used in the technical field concerned. The safety viewpoints make it possible to compensate for the errors of detection of the observer's position by the dedicated device (related to the temporary offset between the observer's actual position and the detection of the position, as well as to the accuracy of the detection device as such).

Because the position of the observer relative to the screen is known, the screen viewpoints projected towards each of the eyes of the observer at the detected position can be determined. It is therefore possible to assign to the known screen viewpoints, the viewpoints of the image to be projected, and to utilize the screen viewpoints that are not visible by the privileged observer, to display safety viewpoints that compensate for the detection errors and make it possible to conceal the transitions visible by the observer.

In particular, the portions of the screen that are visible depending on the position of the observer change not only when the observer moves parallel to the screen, but also when the observer moves perpendicular to the screen. In the case of movement perpendicular to the screen, the portions of the screen that enable the different screen viewpoints to be seen seem to expand or reduce in width depending on the direction of movement. Before and after the solid colour distance, the order of appearance of the different screen viewpoints is reversed, and at the solid colour only one viewpoint is perceived, as explained previously.

The invention therefore allows all of the observer's movements to be taken into account in order to continuously adapt the display on the screen and eliminate the disadvantages of the display methods of the prior art.

The safety viewpoints can be formed by a copy of one of the viewpoints of the image, i.e. the viewpoint dedicated to the right eye or the viewpoint dedicated to the left eye. For example, at the solid colour and in the case of a multi-viewpoint screen configured to display eight viewpoints, once the two image viewpoints are assigned to two screen viewpoints that depend on the position of the observer, the method can provide that the six remaining safety viewpoints display the image viewpoint dedicated to the right eye three times, and the image viewpoint dedicated to the left eye three times.

Advantageously and according to the invention, the method includes a step of calculating, for each detected position and for at least one eye of the observer, called director eye—particularly for each eye of the observer—moiré strips formed at that detected position so as to be able to substitute each subpixel contributing to form each moiré strip at that position, for the corresponding subpixel of the image strip dedicated to that eye, in such a way as to form a simulated solid colour, called false solid colour, at the detected position.

Advantageously, this variant is particularly useful for quickly adapting the display to movements of the observer perpendicular to the screen. Indeed, as soon as the observer moves away from the solid colour distance (i.e. he approaches or moves away from the screen relative to the nominal observation distance at which a single screen viewpoint is projected to one eye of the observer), moiré figures appear on the screen. The moiré figures result from the overlay of the lenticular array and matrix of pixels forming the display screen. To compensate for this phenomenon, the method according to this variant of the invention provides for replacing, for each eye, each moiré strip by the image strip dedicated to that eye. This allows a false solid colour to be created at the detected distance, i.e. to simulate that the display screen and the array of cylindrical lenticules are configured to allow the projection of two predetermined viewpoints of the simulated screen respectively to the right eye and the left eye of a privileged observer situated at that detected distance.

Considering, for example, a screen of eight viewpoints (in other words N is equal to 8), and a test pattern consisting of eight different colours displayed on the screen associated with a lenticular array configured so that the screen viewpoints 1-4, 2-5, etc. are projected toward the two eyes of the observer at the nominal distance of 85 cm. As soon as the observer changes his distance to the screen, strips appear on the screen that are ever more numerous and narrow. It is then possible, by knowing the position of the observer relative to the screen, to replace the strips of colours with image strips dedicated to the eyes of the observer, and this is done for each eye. Thus, not only is the relative place of transition modified in the initial order of succession of viewpoints, but a false solid colour is reconstructed to compensate for the movement in Z and the X and/or Y phase shift of the observer.

When the images to be displayed are of the type already captured or calculated and cannot be modified, then the place of the observer is taken into account by movement of the same initial pixels. If a real time 3D relief calculation system is available, it becomes possible, after identification of the movement of the observer, to modify the content to be displayed in real time and to give the illusion of being in a three-dimensional volume integrating the X, Y and Z movements of the observer for a perfect illusion.

The invention according to this variant therefore includes a step of determining moiré strips visible by each eye of the observer at each detected position. As previously indicated, the moiré strips result from the overlay of the lenticular array and of the matrix of pixels forming the display screen, and therefore depend on the display screen concerned and the array of cylindrical lenticules concerned. Thus, knowledge of the pitch of the array of cylindrical lenticules, the perforation pitch of the display screen, the size of the screen, the solid colour distance of the assembly formed by the screen and the array of cylindrical lenticules, and of the angle of the cylindrical lenticules relative to the columns of the screen, enable the moiré strips visible at each observation distance to be calculated. Thus, when the observer moves in the X, Y and Z directions, only the calculation of the moiré strips is necessary to compensate for this movement, for the full height of the image as well as the full width thereof.

Moreover, the method applies in the same way for all screens of the same size, same resolution, same number of viewpoints and the same solid colour. In other words, it is sufficient to determine the moirés equation associated with a specific screen to be able to implement the method according to the invention with all screens, irrespective of the serial number of the selected screen in its category. No ray tracing calculation is necessary with a method according to the invention, which very significantly simplifies the steps of implementing the method according to the invention.

Advantageously and according to the invention, the method includes, for each position, a step of calculating a phase shift between the two eyes of the observer, so as to be able to determine the moiré strips visible by the complementary eye of the director eye, from the calculation of the moiré strips of the director eye and of the calculated phase shift.

This advantageous variant allows the phase shift that exists between the two eyes of the observer to be taken into account. In particular, if one eye of the observer is considered (for example his right eye) which is moved in the Z direction while remaining centred on the middle of one viewpoint of the screen, then his left eye, depending on the distance of the observer to the screen, will successively pass through the other screen viewpoints, in phase position and phase opposition. The phase shift between the two eyes of the observer depends on the distance of the observer relative to the screen.

According to another variant, each eye of the observer is followed by the tracking device (or by a device dedicated to each eye) so that the moiré strips are determined from the detected position of each of the two eyes.

According to one variant of the invention, at least one safety viewpoint is formed of a mixture of image strips that is created by the addition to the first image viewpoint of a negative percentage of the second image viewpoint.

In other words, at least one safety viewpoint is formed by subtracting from the first image viewpoint a predetermined negative percentage from the other image viewpoint.

This allows the cancellation of the appearance of a phantom image. In particular, benefiting from the existence of safety viewpoints, which in principle are not visible by the user, but in practice still projected in his field of view because the position detectors do not make it possible to supply position measurements that are instantaneous and totally accurate, the method according to this variant provides for modifying the image displayed to him by subtracting a certain negative percentage, from the other viewpoint, in order to cancel out the phantom image found therein and which is always a certain positive percentage of the other juxtaposed viewpoint. The two images, the phantom due to the imperfections of the physical system (primarily refractive optics and residual diffusion) and the adjusted anti-phantom (computer calculation, after calibration, of the negative intensity image equivalent to subtracting the principal image) thus cancelling each other out.

It should be understood that management of the safety viewpoints (composed of a single screen viewpoint at the solid colour distance and strips of varying widths elsewhere) depends on the position of the observer relative to the screen, since it is this position of the observer that defines which screen viewpoints are visible by the observer, and therefore it is the observer's position that conditions the construction of the safety viewpoints based on the desired objectives (elimination of phantom images, elimination of pseudoscopic images, etc.).

According to one variant of the invention, the safety viewpoints can also be used to display image viewpoints dedicated to a second privileged observer whose position relative to the screen is determined by another dedicated tracking device. This variant is only possible if N is greater than or equal to 4.

Advantageously and according to the invention, the display screen is a seven-viewpoint screen configured so that the viewpoints visible by the eyes of the privileged observer at the solid colour distance are screen viewpoints separated from each other by two viewpoints, so that the visible pairs are the views 1-4, 2-5, 3-7 for viewpoints numbered successively from 1 to 7.

This variant makes it possible to keep two viewpoints available between the observer's two eyes at the solid colour distance, which facilitates the management of the display in the event of movement of the observer perpendicular to the screen. Indeed, because the privileged observer sees stereoscopic bases that vary as a function of his Z movements, it is pertinent to have at least two viewpoints available at the solid colour distance to offer great freedom of movement to the privileged observer without risk of loss in quality of observation. Of course, other configurations are also possible without substantially modifying the effect achieved by the invention.

The invention also relates to a method of controlling the display on an autostereoscopic display screen (E) of N viewpoints, N being greater than or equal to 3, associated with a device for detecting the position of a privileged observer in front of the screen, including:
  a step of detecting the position of the observer by the detection device, allowing a presence of the observer to be defined in one presence zone from among at least three predetermined presence zones delimiting the space in front of the screen,
  a step of displaying an autostereoscopic image of two viewpoints by the implementation of the display method according to the invention, if the observer is in a first predetermined presence zone,
  a step of displaying an autostereoscopic image of N viewpoints if the observer is in a second predetermined presence zone,
  a step of displaying a two-dimensional image formed by the display of a single image on each of the screen viewpoints, if the observer is in a third predetermined presence zone.

A control method according to the invention allows the display mode to be adapted (i.e. the content displayed and the manner in which the content is displayed) on an autostereoscopic display screen as a function of the presence zone in which the privileged observer is located. The method according to the invention provides at least three different display modes for at least three predetermined presence zones (a first presence zone, a second presence zone and a third presence zone). In particular, the control method allows the predetermined observer to be located in one zone among at least three predetermined zones (which are advantageously defined by intervals of distance relative to the screen) and to define a type of display (both as concerns the content displayed and the way in which the content is displayed on the screen) for each zone. A control method according to the invention therefore enables the display to be adapted to the movements of the observer by providing a way to display the content of the image for each zone, including in the case of loss of tracking of the observer's movements that are very far from or very close to the screen compared to the nominal utilization distance thereof.

For example, if the observer moves away from the screen so that the tracking device is no longer operational (advantageously, the second presence zone corresponds to a zone for which the detection device does not allow a position of the observer to be supplied), the method controls an autostereoscopic display of N viewpoints. In other words, if the detection device does not enable the presence of the observer to be detected in the first or third presence zone, then he is in the predetermined second zone of presence. In this case, the method controls the display of an autostereoscopic image of N viewpoints.

If the presence of the observer is recognised in the first zone (i.e. at a proper distance from the screen for using the tracking device and detecting the position of both eyes of the observer), the method implements the display method of an autostereoscopic image of two viewpoints on the autostereoscopic screen of N viewpoints according to the invention.

If the observer is not present in any of the aforementioned zones (forming the third zone), he controls a safety display that consists of displaying a flat two-dimensional image. This image is formed by the display of the same image for both eyes on each of N viewpoints of the screen.

It should be noted that in the case where the presence of the observer is recognised in the third zone, the tracking device can enable the head of the observer to be detected, in which case the method can adapt the display of the flat image as a function of the movements of the observer, which enables an interaction between the observer and the image, including in the third zone.

In the case where the observer is in the first zone in which the tracking device is totally operational, the method displays a two-viewpoint image on the screen of N viewpoints. The display and the content of the image can be modified as a function of the movements of the observer. If the content is real-time 3D content, the content displayed can be modified as a function of the movements of the observer. If the content is pre-recorded, the display of the content can be modified as a function of the movements of the observer.

Moreover, the invention allows the use of a multi-viewpoint screen without a tracking device, initially provided in order to have a solid colour at an observation distance D, under standard observation conditions of viewpoint pairs 1-2; 2-3; 3-4; 4-5 etc. and using the same screen with a tracking device at a simulated solid colour distance corresponding, for example, to D/3, under observation conditions of pairs 1-4; 2-5; 3-6 etc. Under these conditions, the same screen can serve both usages: when one is rather far from the screen, multi-viewpoint images are displayed thereon and when one is closer, at a usage distance with tracking (i.e. if the distance detected is within a predetermined interval of observation distances), and for only one person at a time, a simulated solid colour is created at D/3 and the device as a whole remains coherent and controlled for this new usage.

In other words, the control method of the display screen according to the invention makes it possible to switch, from a display of N viewpoints on a screen configured to display N viewpoints, to a display of two viewpoints on the same screen configured to display N viewpoints, as soon as the observer enters or leaves, by his movements relative to the screen, a predetermined zone enabling his detection by the detection device. Finally, the method allows the display of a two-dimensional image when no other display is possible.

The invention also concerns a display system of an autostereoscopic image of two viewpoints, the viewpoints of the image, each formed of a plurality of strips of subpixels, called image strips, on an autostereoscopic display screen configured to display N viewpoints, called screen viewpoints, N being greater than or equal to 3, the system including:

an autostereoscopic display screen of N viewpoints including a matrix of pixels arranged in lines and columns, each pixel being composed of a plurality of subpixels of different colours, the display screen being overlaid by an array of cylindrical lenticules configured to allow the projection of two predetermined screen viewpoints respectively to the right eye and the left eye of privileged observer located at a nominal distance from the screen, called solid colour distance.

a device for detecting, at each instant, the position of the observer relative to a predetermined point of the display screen, allowing the coordinates X, Y, Z of the observer to be defined with a predetermined accuracy, in an orthonormal reference system in which the predetermined point of the screen is the origin of the reference system, the screen defining the X and Y axes of the reference system and the direction perpendicular to the screen defining the Z axis of the reference system, a module for determining, for each eye of the observer, at the detected position, subpixels of the screen forming strips visible by that eye and forming $1/N^{th}$ of the total screen, a module for determining, for each eye of the observer, at the detected position, subpixels of the screen forming strips of the screen that are not visible by either of the observer's two eyes and corresponding to $N-2/N^{th}$ of the total screen, a module for assigning to the subpixels of each visible strip of the screen, for each eye of the observer at the detected position, subpixels of the respective strip of each of the two image viewpoints, a module for assigning to the subpixels of the strips not visible on the screen, subpixels corresponding to viewpoints, called safety viewpoints, constructed from subpixels of image viewpoints and intended to compensate for the accuracy of detection of the position of the privileged observer.

A system according to the invention advantageously implements a method according to the invention and a method according to the invention is advantageously implemented by a device according to the invention. Also, the advantages and effects of the method according to the invention apply to the display system according to the invention.

The device for detecting the position of the privileged observer can be of any type. For example, it can involve a device including a radiofrequency signal transmitter carried by the observer cooperating with location-determining receivers integral with the screen. It can also involve a sensor for detection and recognition of the movements of the eyes of the observer, mounted on the screen or in the vicinity of the display screen. In general, it can involve any type of means configured to detect the position of the eyes or head of the observer relative to the display screen.

The system according to the invention also includes a module for determining strips of the screen visible by the observer and a module for determining strips not visible by the observer. It also includes a module for assigning to the subpixels of the visible strips of the screen, subpixels of the respective image strip, and a module for assigning to the subpixels of the strips not visible of the screen, subpixels corresponding to safety points intended to compensate for the low accuracy of detection of the position of the privileged observer.

Throughout the text, module is understood as a software element, a subassembly of a software program, either to be used independently, or to be assembled with other modules of a program, or a hardware element, or a combination of a hardware element and a software subroutine.

Preferably, the modules of the system according to the invention are subsets of a software program intended to be executed by a computer or by a microprocessor connected to the display screen.

The applications of a system and a method according to the invention are numerous and varied.

In the field of automobiles, instrument clusters, but also systems known as Head-Up Display (HUD) can implement the invention, which makes it possible to display directly in the driving environment, in a way that's credible and realistic, useful information for driving and safety. The great depth of field and the control of collimation make it possible to superimpose for a privileged observer, the driver, the position of whose both eyes is known at every moment, information at the proper location in front of the vehicle, on the road and a bit above, at true distances and according to proper perspective.

In the medical field, the invention allows an image to be supplied from a stereoscopic endoscope. Using only two viewpoints obtained by the stereoscopic endoscope avoids requiring long and costly procedures for certification of the system if additional points must be created that are deduced from the two points of view delivered initially by the endoscope. The privileged observer, the surgeon, can benefit from an image in relief with native quality, without spectacles.

Other applications can be considered, such as individual projection screens in aircraft. The possibility of being able to be very close to the screen also makes it possible to associate a touchpad or contactless interaction system for quick interaction with the content. The latter could even be the main tracking system.

Within the field of video games, the invention allows 3D to be shown in real time and applies both to arcade games as well as to slot machines, etc.

It is also possible to conceive computer tablets, portable telephones, of individual usage by nature, for displaying any type of video content.

The invention also concerns a display method and a display system which are characterized in combination by all or part of the characteristics mentioned above or hereinafter.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

In the figures, the scales and proportions are not strictly respected, for purposes of illustration and clarity. In all the figures, the information contained by a screen viewpoint is indicated by crosshatching. Different crosshatching illustrates different screen viewpoints.

Figure 1:
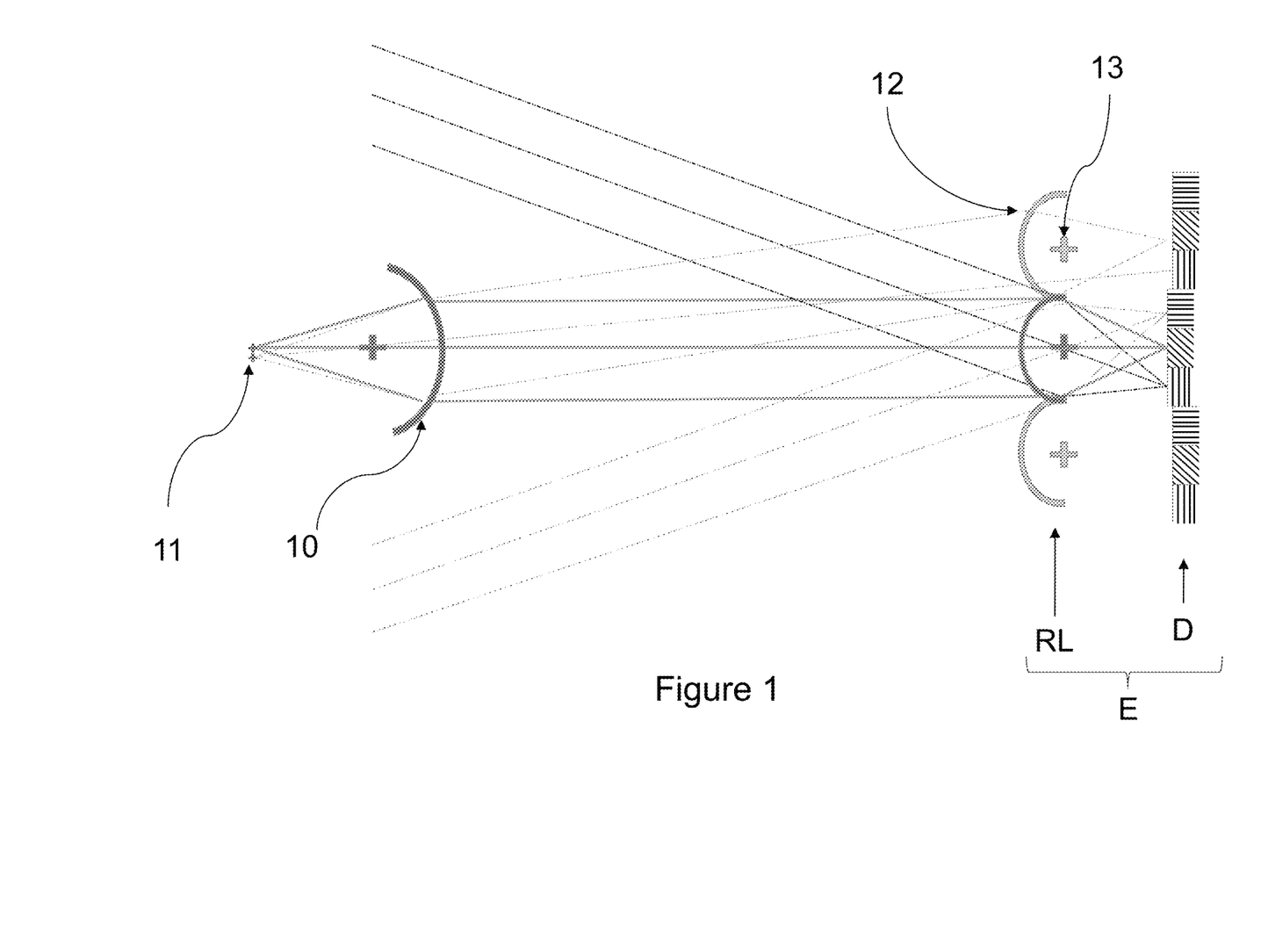
FIG. 1 is a schematic view illustrating the path of the light rays emitted by an autostereoscopic display screen to an eye of an observer.

FIG. 1 schematically illustrates the path of the light rays from a panel of pixels D of an autostereoscopic display screen E to the pupil 10 of an observer. The light rays are diverted by an optical device, of the RL type lenticular array, to converge towards the pupil 10 of an observer. The autostereoscopic display screen E of FIG. 1 includes three screen viewpoints represented schematically by three different types of crosshatching (horizontal, slanted and vertical). Each lens 12 of the lenticular array covers one set of pixels of the three viewpoints. In FIG. 1, the observer is located at a solid colour distance and the viewpoint of slanted crosshatching is projected towards the eye of the observer. The same phenomenon occurs for the other eye of the observer, so that at the solid colour distance, each eye of the observer perceives a different viewpoint of the same scene, which generates an impression of relief in the brain of the observer.

Figure 2:
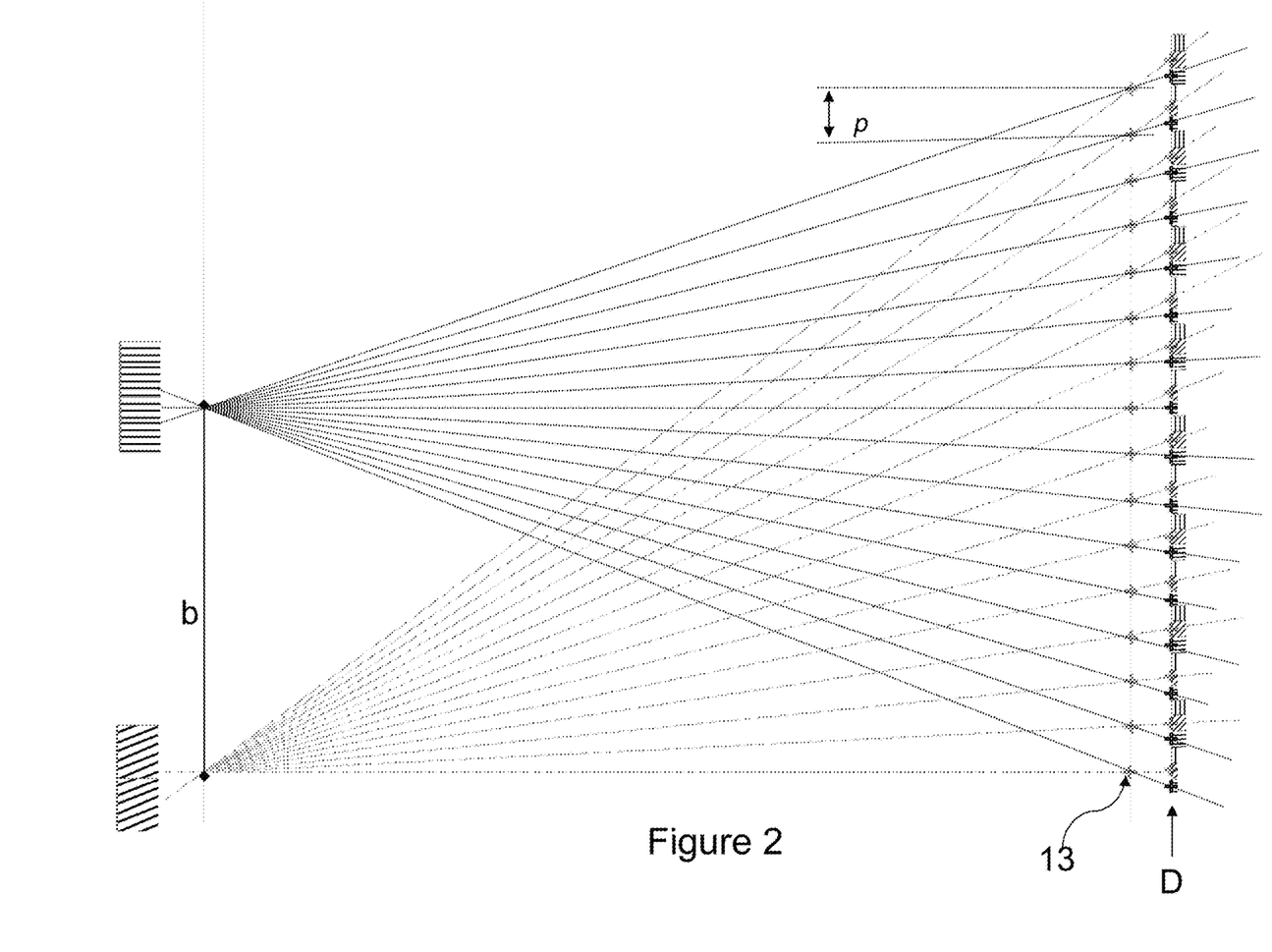
FIG. 2 is a schematic view illustrating the change of perception for an eye of an observer at the solid colour distance.

FIG. 2 schematically illustrates what occurs for an eye of the observer, when he moves a predetermined distance, called stereoscopic base and represented by the letter b, parallel to the autostereoscopic display screen. The stereoscopic base is an intrinsic characteristic of the display screen that depends on the panel of pixels D used, the lenticular array RL used and particularly the pitch p thereof. In this figure, the lenticular array is only represented by the optical centres 13 of the lenses. When an eye of the observer is located at a position represented at the lower left of the figure, he perceives the pixels from the viewpoint of the slanted crosshatching. In other words, all the light rays issued from the slanted crosshatching viewpoint are projected towards the eye of the observer. If the observer moves parallel to the screen along the stereoscopic base b to reach the position represented at the upper left of the figure, then his eye now perceives all of the pixels from the viewpoint that is adjacent to the horizontal crosshatching.

Figure 3:
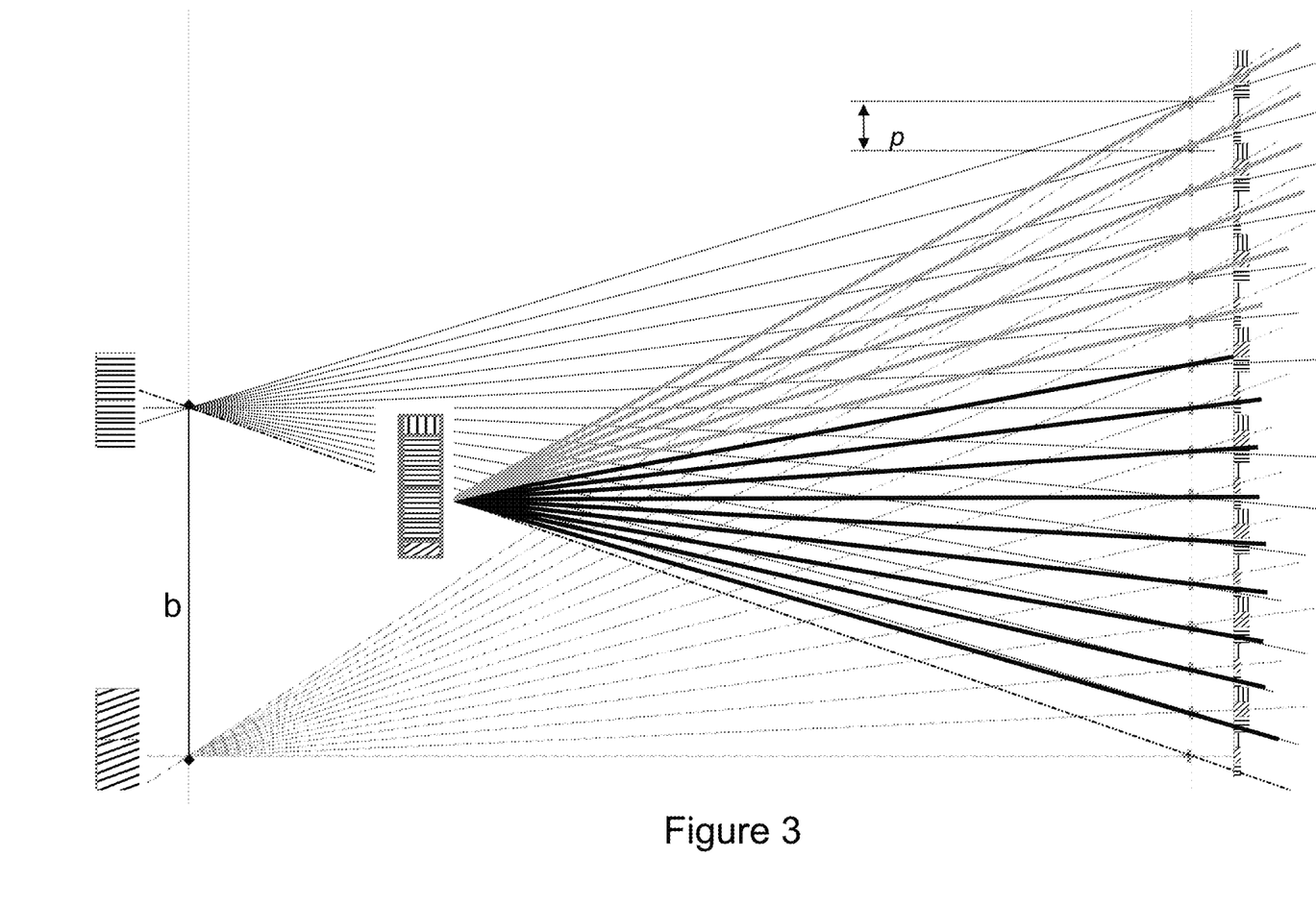
FIG. 3 is a schematic view illustrating the change of perception for an eye of an observer when he approaches the display screen.

FIG. 3 schematically illustrates what occurs for one eye of the observer, when he moves along an axis connecting the points at the solid colour, which are shifted at a multiple distance from the stereoscopic base b and the centre of the screen. During movement of the observer's eye perpendicularly to the screen, the subpixels of the screen forming strips visible to that eye change relative to the subpixels of the screen that are visible at the solid colour distance. Indeed, it is found that the eye not only perceives subpixels belonging to the horizontal crosshatching viewpoint, but also subpixels from the viewpoint adjacent to the slanted crosshatching.

The closer the observer approaches the screen, the more his eye is going to perceive strips of portions of screen viewpoints.

Thus, the invention provides for using an autostereoscopic display screen configured to display N viewpoints and to use it only to display two image viewpoints, intended for a privileged observer.

Figure 4:
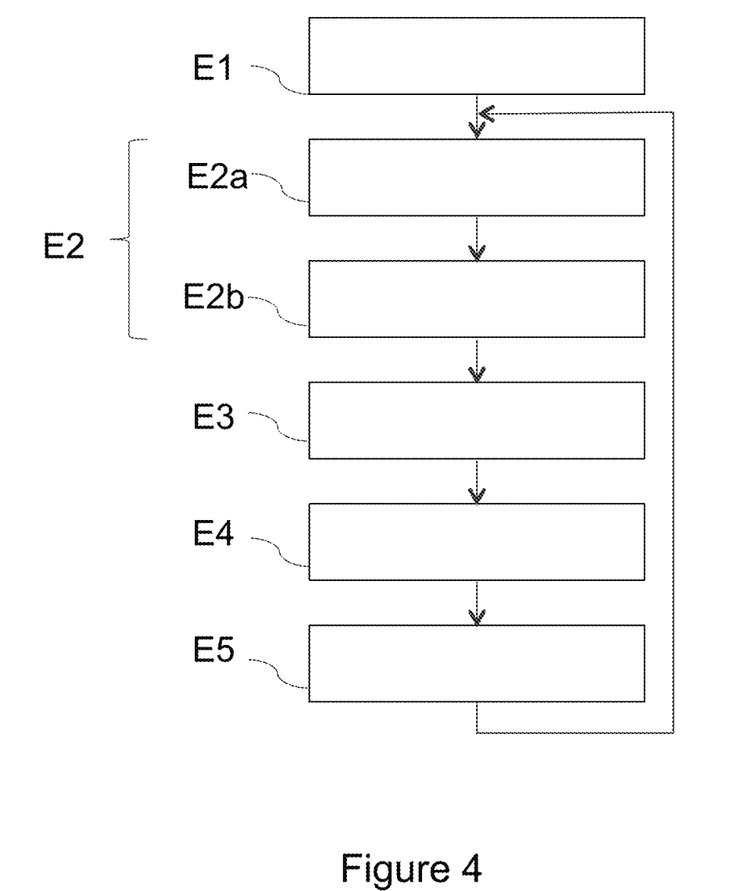
FIG. 4 is a schematic view of a display method according to one embodiment of the invention.
Figure 5:
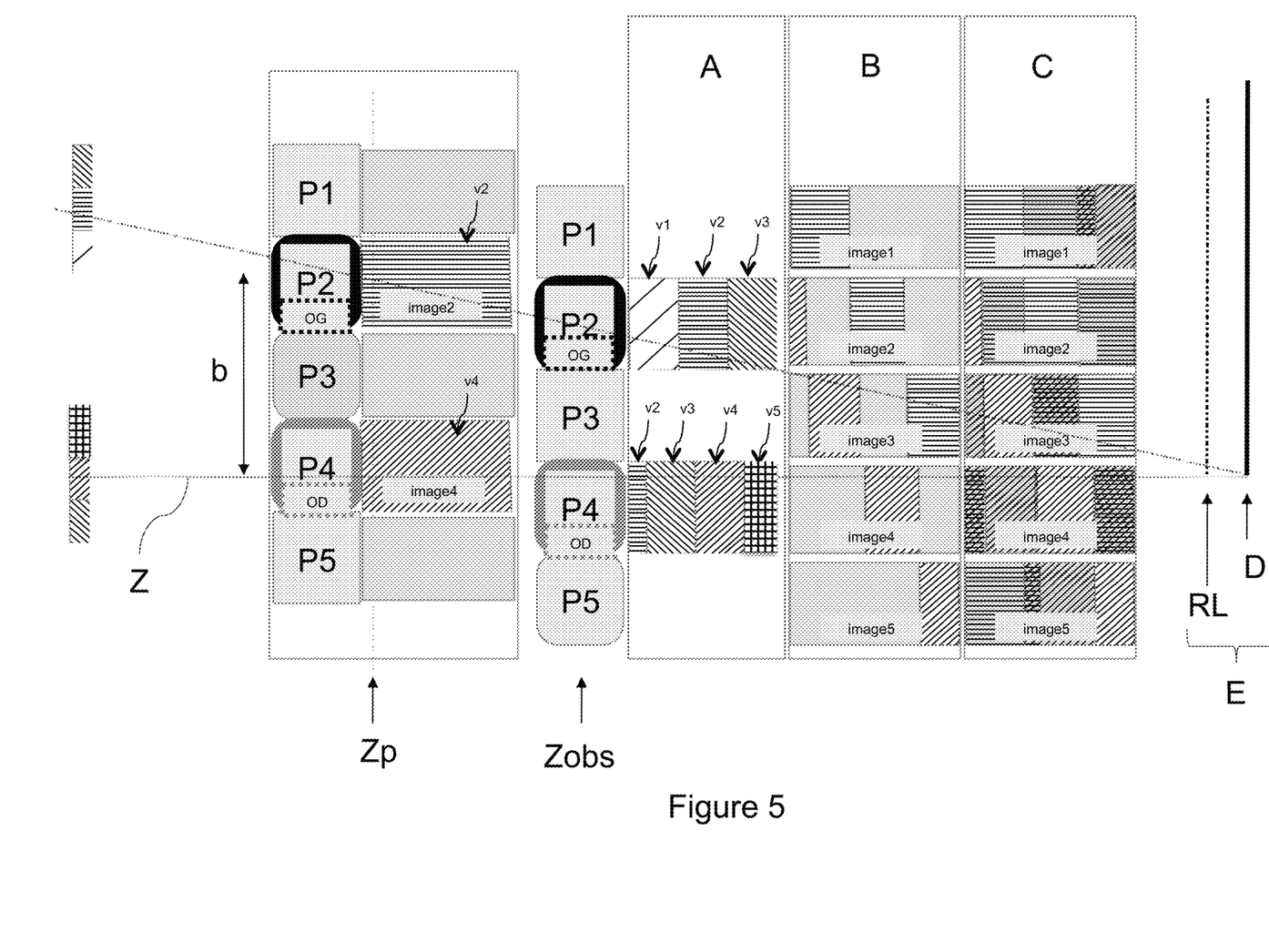
FIG. 5 is a schematic view of the assignment steps of a method according to one embodiment of the invention.
Figure 6:
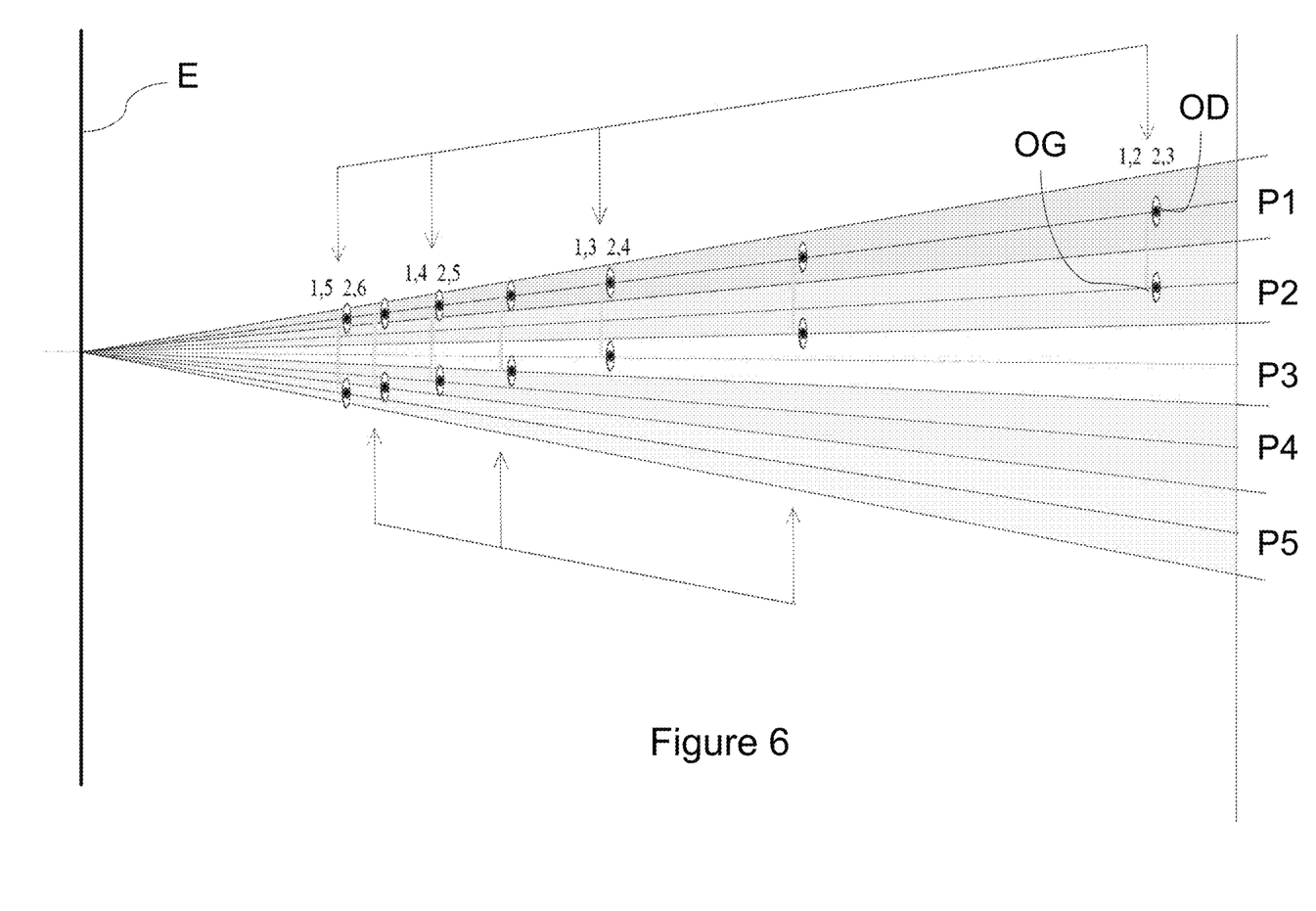
FIG. 6 is a schematic view illustrating the phase shift between the eyes of a privileged observer during a movement towards the display screen.
Figure 7:
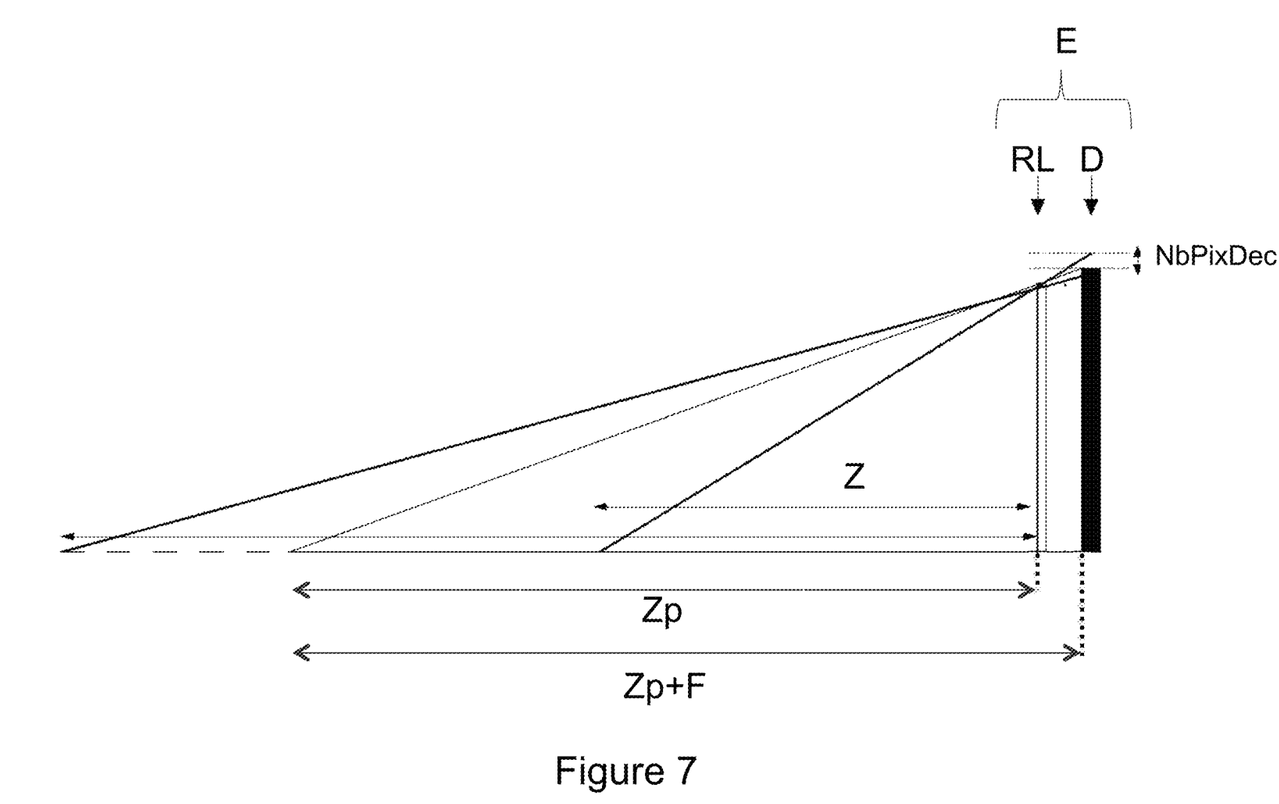
FIG. 7 is a schematic view illustrating the principle of calculating moiré strips implemented by the method according to the invention.

This method includes a plurality of steps organised according to the schematic diagram of FIG. 4, the operating principle whereof is illustrated in FIGS. 5, 6 and 7.

The method includes a first step of detection E1, at each instant, of the position of the observer relative to a predetermined point of the display screen, for example the centre of the screen. The detection enables the coordinates X, Y, Z of the observer to be supplied in a predetermined system of reference relative to the display screen E.

The method then includes a step E2 of determination, for each eye of the observer at the detected position, of the subpixels from the screen that form strips that are visible by that eye. As discussed hereinafter, the step E2 of determination of strips that are visible by the eye, can implement a step E2a of calculating moiré strips at the position and a step E2b of calculating a phase shift between the two eyes of the observer.

The method also includes a step E3 of determination of subpixels of the screen, that form strips of the screen that are not visible by either of the observer's eyes at the detected position.

Once the visible and non-visible strips are determined at the detected position of the observer, the method can assign to each subpixel of each visible and non-visible strip, the information necessary to address the image strips dedicated to each eye of the observer and to construct safety viewpoints intended to occupy the subpixels of the screen that are not visible by the observer.

For this purpose, the method includes a step E4 of assignment to the subpixels of each visible strip of the screen, for each eye of the observer at the detected position, of the subpixels of the corresponding image strip for the eye and step E5 of assignment to the subpixels of strips of the screen not visible by either of the observers two eyes, of the subpixels corresponding to the safety viewpoints, constructed from subpixels of image strips and intended to adapt the display to the X, Y, Z movements of the observer and to compensate for the accuracy of detection of the position of the privileged observer.

Upon completion of the step E5, or when the detection device detects a movement of the observer, the method returns to step E2 of determination of visible strips at the new detected position.

The operating principle of the different steps E2, E3, E4 and E5 is schematically represented in FIGS. 5, 6 and 7.

In the figures, the Z-axis represents the axis perpendicular to display screen E that allows the distance of the observer to the display screen to be measured. The distance Zp represents the solid colour distance for the display screen concerned, i.e. the distance at which two predetermined views of the screen are projected towards the two eyes of the observer. The distance Zobs represents the distance detected by a dedicated tracking device. In FIG. 5, the references P1, P2, P3, P4 and P5 represent the screen viewpoints, and the image represented in the box to the right of each viewpoint, represents the image displayed by the viewpoint. Thus, at the solid colour distance Zp, the right eye OD is considered to observe the image v4 represented by hashmarks and slanted at +45°, and the left eye OG observes the image v2 represented by the horizontal hashmarks.

When the observer moves perpendicularly to the screen and is located at a distance Zobs, he leaves the solid colour distance so that he perceives a plurality of strips belonging to a plurality of screen viewpoints. In the figure, at the detected distance Zobs, the left eye OG should perceive strips v1, v2, v3 and the right eye OD strips v2, v3, v4, v5. This is represented in the box referenced A in FIG. 5.

The method therefore makes it possible to assign to each visible strip the subpixels of the corresponding image strip for the eye. This is represented in the box referenced as B in FIG. 5. For example, considering the left eye OG, the visible strip at the spaced slanted crosshatching of image v1 of the viewpoint P1 is replaced by the corresponding strip of the image dedicated to that eye, i.e. the image v2 at the horizontal crosshatching. The central strip of the image v2 at the horizontal crosshatching of the viewpoint v2 maintains the corresponding strip of the image dedicated to that eye. Finally, the visible strip of the image v3 at the crosshatching slanted at −45° of the viewpoint P3 is replaced by the corresponding strip of the image v2 at the horizontal crosshatching dedicated to that eye. This is what appears in the image 3, represented in the box B. The corresponding strips must also be assigned for the right eye OD. Thus, the image 2 represented in box B includes a left strip dedicated to the right eye OD and represented by the crosshatching slanted +45°. By repeating this process, the method makes it possible to assign the corresponding strips to each strip visible by each eye.

The images represented in box C illustrate the image displayed by each screen viewpoint once the assignment steps are finalized. The strips of each viewpoint not used by either of the two eyes enable safety information to be displayed.

The offset observed of the right eye OD relative to the left eye OG is explained by the phase shift between the two eyes of the observer that is schematically represented in FIG. 6.

In observing FIG. 6, if one considers that the right eye OD moves in approaching the screen E, while remaining centred at the middle of the viewpoint P1, one then notes that the left eye OG, depending on the distance of the user to the screen E, successively passes through the viewpoints P2, P3, P4 and P5, in phase position and phase opposition, and does so in a continuous manner. One will also note that there is a transition from a configuration in which the two eyes of the observer receive information from two contiguous viewpoints (represented by the pair 1-2; 2-3) when at a distance from the screen, to configurations corresponding to greater and greater spacing. From pairs 1-2; 2-3; etc., there is a transition to the pairs 1-3; 2-4; etc., then to the pairs 1-4; 2-5, etc., then to the pairs 1-2; 2-6, etc.

The invention makes it possible to adapt the display of the changes of autostereoscopic pairs by systematically placing the transitions where the eyes cannot see them.

The invention preferably includes a step E2a of calculating for each detected position and for at least one eye of the observer (preferably for each of the two eyes), moiré strips formed at the detected position, so as to be able to substitute each subpixel contributing to form each moiré strip at the position, for the corresponding subpixel of the image strip dedicated to the eye. This allows a simulated solid colour to be formed at the detected position.

The calculation of moiré strips makes it possible to find the view numbers displayed on the screen according to the X, Y, Z position of the observer in the reference system relative to the centre of the screen, for example.

Consider, for example, the point at the top of the screen, centred on the horizontal. One determined the number of the view to be displayed on the pixel according to the position (X, Y, Z) in the system of reference relative to the point.

To do this, the stereoscopic base of the system in X is denoted ParVueBaseX, i.e. the X distance to travel to change the viewpoint if one is at the solid colour distance; the stereoscopic base of the Y system is denoted ParVueBaseY, i.e. the Y distance to travel to change viewpoint if one is at the solid colour distance; the solid colour distance is denoted Zp; and X, Y and Z the coordinates of the observer (his right eye for example) in the reference system relative to the screen as previously defined.

The simulated stereoscopic bases are first calculated at the distance Z by the following formulas:

ParVueBaseXrect=ParVueBaseX*Z/Zp

ParVueBaseYrect=ParVueBaseY*Z/Zp

These values correspond to the standardization according to the distance of the detected X and Y position, so as to find the angles from which the light rays having passed through the lenticular array arrive at the observer.

The values are then found of the view observed at the point of the screen by finding phase shifting in number of views traversed according to the X and Y positions.

The overall offset Dg of view number is equal to

Dg=DecalcolourOri+X/ParVueBaseXrect+Y/ParVueBaseYrect

In this formula, DecalcolourOri reflects a possible alignment offset of the optical system with the panel during manufacture of the screen.

The set of values of different pixels can be found relative to the reference pixel by taking into account the X position of the pixel for which the value is sought relative to the lens (with the slope thereof), and which corresponds to the repetition of the phenomena along the same axis; and the Z position of the observer and the X position of the pixel that defines the offset in moiré strips traversed.

According to Thales rules of geometry illustrated schematically in FIG. 7, the width is then found of the moiré strips according to the observation distance Z. Indeed, this width corresponds to the number of pixels NbPixDec (in addition or in subtraction relative to the number of original pixels) covered by the lenticular array from the distance of the observer.

If one notes NbPix, the number of pixels on a half-screen, then the following formula is obtained:

NbPixDec=NbPix*((Z+Focal)/Z*Zp/(Zp+Focal)−1)

To find the phase shift in view number relative to the central lens, the signed value of the phase shift is then added to the phase shift previously found, knowing that NbPixDec can be negative if the array covers fewer pixels (if one is farther away than the solid colour).

Figure 8:
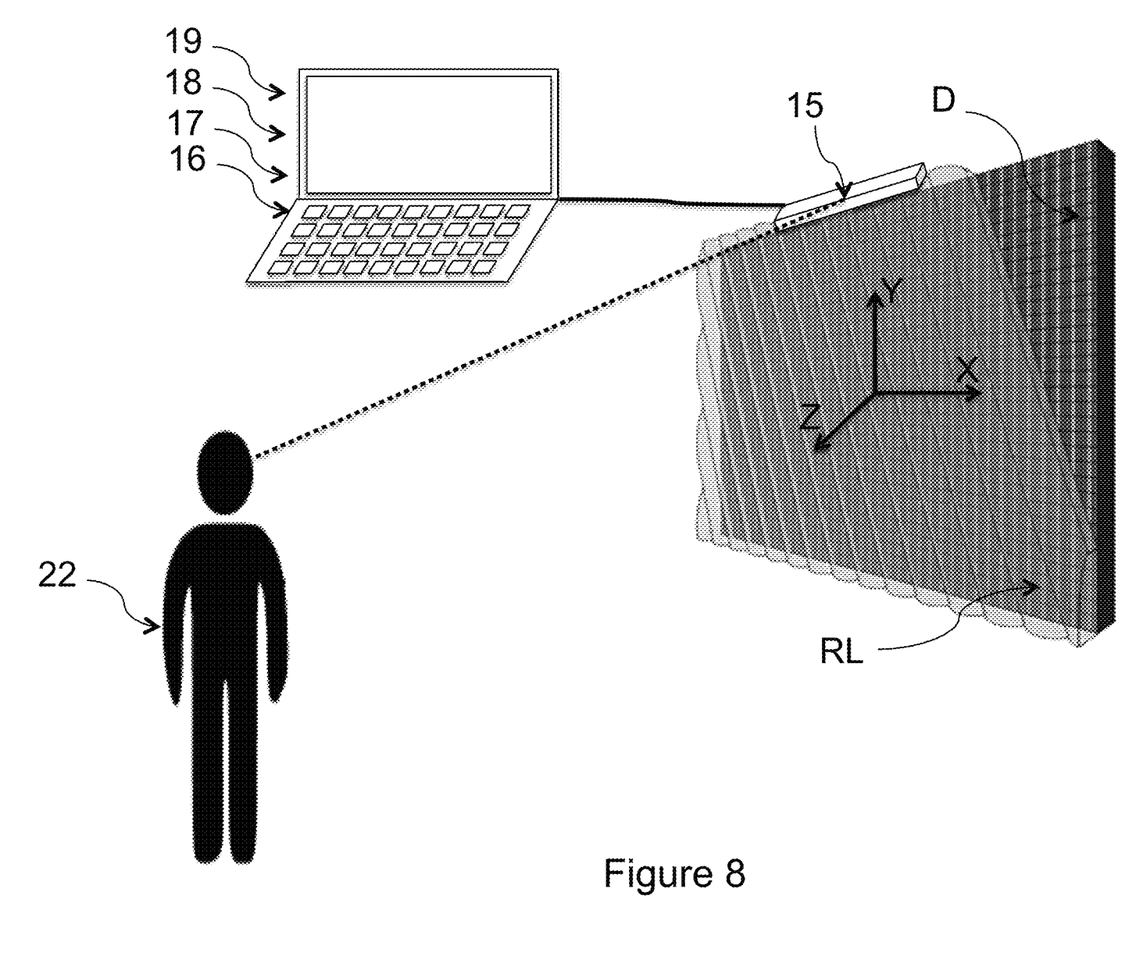
FIG. 8 is a schematic view of a system of display of an autostereoscopic image according to one embodiment of the invention.

FIG. 8 is a schematic view of a display system according to the invention including an autostereoscopic screen E including a panel D of pixels and an array of cylindrical lenticules RL. The display system also includes a device 15 for detecting the position of a privileged observer 22 relative to a predetermined point of the display screen.

The system also includes a module 16 for determination, for each eye of the observer, at the detected position, of the subpixels of the screen forming strips that are visible by that eye and forming 1/Nth of the total screen, a module 17 for determination, for each eye of the observer, at the detected position, subpixels of the screen forming strips of the screen that are not visible by either of the observer's eyes and corresponding to N−2/Nth of the total screen, a module 18 for assignment to the subpixels of each visible strip of the screen, for each eye of the observer at the detected position, subpixels of the corresponding strip of each of the two image viewpoints, and a module 19 for assignment, to the subpixels of the strips not visible of the screen, of subpixels corresponding to viewpoints, the safety viewpoints, constructed from subpixels of image viewpoints and intended to compensate for the accuracy of detection of the position of the privileged observer.

The modules 16, 17, 18, 19 of the system are, for example, subsets of a software program intended to be executed by a computer or by a microprocessor connected to the display screen. This configuration is represented schematically in FIG. 8. The software implemented by the computer also preferably implements the calculation module, preferably for each eye of the observer 22, for each detected position of the moiré strips formed at that detected position so as to be able to substitute each subpixel contributing to form each moiré strip at the position, for the corresponding subpixel of the image strip dedicated to each eye, so as to form a false solid colour at the detected position.

The invention can be implemented on any type of autostereoscopic display screen for which the parameters are known and which enable the moiré strips to be calculated that are visible at each position detected by the tracking device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of displaying an autostereoscopic image of two viewpoints, called image viewpoints, each formed of a plurality of image strips comprising strips of subpixels on an autostereoscopic display screen configured to display three or more N screen viewpoints comprising a matrix of pixels arranged by lines and columns, each pixel being composed of a plurality of subpixels of different colours, the display screen comprising an optical component configured to allow projection of two predetermined ones of the screen viewpoints respectively to a right eye and to a left eye of a privileged observer located at a nominal distance from the display screen, the nominal distance comprising a solid colour distance, the method comprising:

a first step for detection, at each instant, of a position of the privileged observer relative to a predetermined point of the display screen, enabling coordinates X, Y, Z of the privileged observer to be defined with a predetermined accuracy, in an orthonormal reference system in which the predetermined point of the display screen is an origin of the orthonormal reference system, the display screen defining X and Y axes of the reference system and a direction perpendicular to the display screen defining a Z axis of the orthonormal reference system, a second step for determining, for each eye of the privileged observer at the detected position, subpixels of the display screen forming strips visible by each eye and corresponding to $1/N^{th}$ viewpoints of the display screen, a third step for determining subpixels of the display screen forming strips of the display screen that are not visible by either eye of the observer at the detected position and corresponding to $N-2/N^{th}$ viewpoints of the display screen, a fourth step for assigning to the said subpixels of each visible strip of the display screen, for each eye of the privileged observer at the said detected position, subpixels of the respective image strip for each eye, a fifth step for assigning to the subpixels of the strips of the display screen not visible by either eye of the privileged observer, subpixels corresponding to safety viewpoints constructed from subpixels of image strips and intended to adapt the display to the X, Y, Z movements of the privileged observer and to compensate for an accuracy of detection of the detected position of the privileged observer.

2. The method according to claim 1, further comprising a sixth step for calculating, for each detected position and for at least one director eye comprising at least one eye of the privileged observer, moiré strips formed at that detected position, so as to be able to substitute each subpixel contributing to form each moiré strip at that position, for the corresponding subpixel of the image strip dedicated to that eye, in such a way as to form a false solid colour comprising a simulated solid colour at the detected position.

3. The method according to claim 2, further comprising, for each position, a seventh step for calculating a phase shift between two eyes of the privileged observer so as to be able to determine the moiré strips visible by a complementary eye of the director eye, from the calculation of the moiré strips of the director eye and of the calculated phase shift.

4. The method according to claim 1, wherein at least one safety viewpoint is constructed from a mixture of image strips that is formed by an addition to a first viewpoint of the image viewpoints of a negative percentage of a second viewpoint of a complementary image.

5. The method according to claim 1, wherein the display screen is a seven-viewpoint screen configured so that the N viewpoints visible by left and right eyes of the privileged observer at the solid colour distance are screen viewpoints separated from each other by two viewpoints, so that the visible pairs are views 1-4, 2-5, 3-7 for viewpoints numbered successively from 1 to 7.

* * * * *